Figure 3:
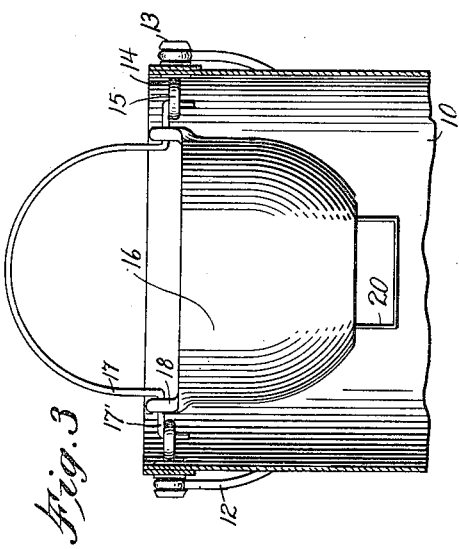

F. AUTY.
PLUMBER'S KIT.
APPLICATION FILED MAR. 12, 1913.

1,075,239.

Patented Oct. 7, 1913.

WITNESSES
F. D. Swert
Geo. L. Beeler

INVENTOR
Frank Auty
BY Munn & Co.
ATTORNEYS

COLUMBIA PLANOGRAPH CO., WASHINGTON, D. C.

UNITED STATES PATENT OFFICE.

FRANK AUTY, OF NEW YORK, N. Y.

PLUMBER'S KIT.

1,075,239.   Specification of Letters Patent.   Patented Oct. 7, 1913.

Application filed March 12, 1913. Serial No. 753,745.

*To all whom it may concern:*

Be it known that I, FRANK AUTY, a citizen of the United States, and a resident of the city of New York, Whitestone, borough of Queens, in the county of Queens and State of New York, have invented a new and Improved Plumber's Kit, of which the following is a full, clear, and exact description.

This invention relates to tools or appliances for plumbers and gasfitters or other mechanics or artisans who operate in connection with plumbing or other metallic fittings.

Among the objects of this invention is to provide a kit serving under certain conditions as a furnace or support for the metal pot, and under other conditions as a carrier or container for the tools and equipment ordinarily used by such an artisan, enabling him to carry his complete outfit conveniently and in but one hand.

The foregoing and other objects of this invention will hereinafter be more fully set forth and claimed and illustrated in the drawings forming a part of this specification in which like characters of reference indicate corresponding parts in all the views, and in which—

Figure 1:
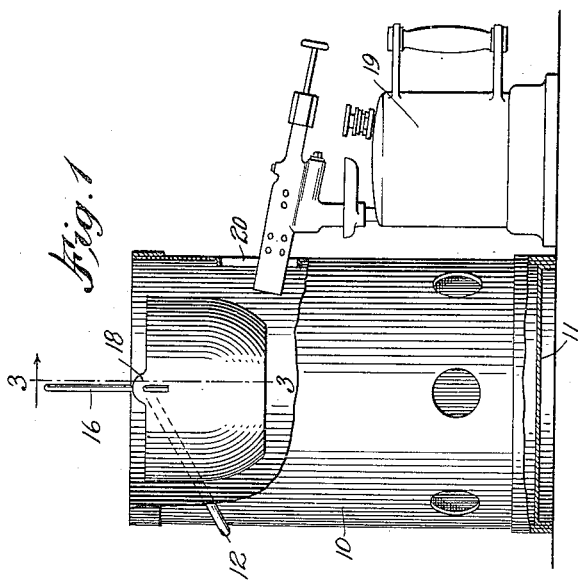
Figure 2:
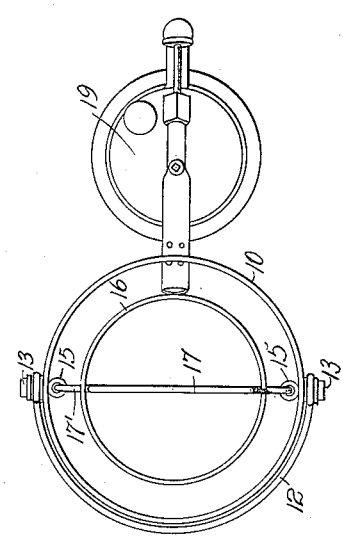

Figure 1 is a side elevation, partly broken away, indicating the device as in use as a furnace, with the metal pot in position to be heated by a heat applying device; Fig. 2 is a plan view of the same; Fig. 3 is a partial vertical section on the line 3—3 of Fig. 1; and Fig. 4 is a perspective view indicating the appearance of the device when packed for transportation.

Referring more particularly to the drawings, I show at 10 a casing of a substantially cylindrical form having an open top and a closed bottom 11. Said casing is provided with a bail 12 pivoted upon a pair of supports 13 each of which includes a shank 14 extending through the upper edge of the casing and having connected therewith an eye or socket 15 within the casing. A melting pot 16, for lead, solder, Babbitt metal or the like, is adapted to be used in connection with this casing as illustrated, said pot being adapted to be supported removably yet securely upon said casing supports 13 through a bail 17 extending normally upwardly from the pot but having its ends projecting outwardly through ears 18 and thence downwardly through said eyes 15. The weight of the pot 16, therefore, is supported between the horizontal portions 17' of the bail 17 and eyes 15. The result, therefore, is the fact that the metal pot will be reliably supported upon said eyes which are stationary and the bail 17 will be maintained in a vertical position whereby it will be within easy reach of the operator when he wishes to lift it from its supports. At 19 I show a well known form of blow torch which constitutes one of the parts of this equipment and which, when lighted, may operate through an opening 20 in the side of the casing for the purpose of melting the metal. By virtue of the casing as a support or furnace for the metal pot, the metal when heated will remain in the molten condition for a considerable length of time within the support, even though the torch be used temporarily by the operator for any of its well known purposes.

Figure 4:
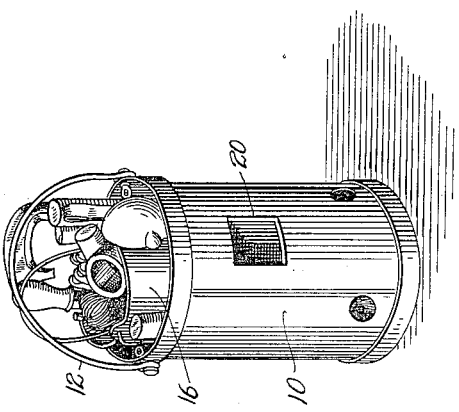

As indicated in Fig. 4, the casing is adapted to constitute a carrier or container for all of the tools usually employed by a plumber or other artisan whereby the entire kit may be packed and carried by one hand by means of the bail 12. It is the practice, during transportation, to house the blow torch within the casing substantially adjacent the bottom thereof and then pack around it or within the open end of the casing all such tools as snips, chisels, gages, bar metal, ladle, plumb bob, rasps, files, pliers, pipe and other wrenches, hack saw, hammer, screw drivers, etc., and in addition thereto the metal pot above described.

Having thus described my invention, I claim as new and desire to secure by Letters Patent:—

1. The herein described kit comprising a casing having an open top, a pair of supports secured in said casing adjacent its top, a bail pivoted to said supports on the outside of the casing, said supports including a pair of eyes on the inside of the casing, a melting pot adapted to be supported within the casing and comprising a bail having outwardly extending horizontal portions terminating in ends extending downwardly through said eyes, and means on the outside of the casing to supply a portable source of heat through one wall thereof to said melting pot.

2. The herein described kit comprising an upright casing adapted to constitute a furnace or support, having an open upper end, and also serving as a container for the usual tools and equipment of a workman, a pair of supports secured to said casing adjacent its top, said supports being stationary and including a pair of eyes within the casing, a melting pot having upwardly extending ears, a bail for the same including outwardly extending horizontal portions extending through said ears and terminating in downward extensions seated in said eyes whereby the melting pot is supported and the bail maintained upright, said casing having an opening on one side adjacent the bottom of the melting pot, and heat applying means operative through said opening upon said melting pot.

In testimony whereof I have signed my name to this specification in the presence of two subscribing witnesses.

FRANK AUTY.

Witnesses:
 GEO. L. BEELER,
 PHILIP D. ROLLHAUS.

Copies of this patent may be obtained for five cents each, by addressing the "Commissioner of Patents, Washington, D. C."